US012724892B1

(12) United States Patent
Dutta et al.

(10) Patent No.: US 12,724,892 B1
(45) Date of Patent: Sep. 1, 2026

(54) SYSTEMS AND METHODS FOR MEASURING ENTROPY DURING FILE BACKUPS

(71) Applicant: Veritas Technologies LLC, Santa Clara, CA (US)

(72) Inventors: Souvik Dutta, Santa Clara, CA (US); Surender V. Brahmaroutu, Round Rock, TX (US)

(73) Assignee: Cohesity, Inc., Santa Clara, CA (US)

( * ) Notice: Subject to any disclaimer, the term of this patent is extended or adjusted under 35 U.S.C. 154(b) by 87 days.

(21) Appl. No.: 18/488,611

(22) Filed: Oct. 17, 2023

(51) Int. Cl.
*G06F 21/55* (2013.01)
*G06F 11/00* (2006.01)
*G06F 11/1446* (2026.01)
*G06F 21/56* (2013.01)

(52) U.S. Cl.
CPC ........ *G06F 21/566* (2013.01); *G06F 11/1466* (2013.01); *G06F 21/554* (2013.01)

(58) Field of Classification Search
None
See application file for complete search history.

(56) References Cited

U.S. PATENT DOCUMENTS 12,292,974 B2 * 5/2025 Jindal .................. G06F 21/566
12,361,122 B2 * 7/2025 Sternfeld ............. G06F 21/554
2014/0195498 A1 * 7/2014 Asher ................ H03M 7/6088 707/693
2017/0090775 A1 * 3/2017 Kowles ................ G06F 3/0611
2018/0107824 A1 * 4/2018 Gibbons, Jr. ......... G06F 21/565
2018/0307839 A1 * 10/2018 Bhave .................. G06F 21/566
2019/0080257 A1 * 3/2019 Chen ........................ G06N 5/04
2019/0294507 A1 * 9/2019 Linnen .................... G06F 17/18
2021/0144405 A1 * 5/2021 Sharangpani .......... H04N 19/61
2021/0240828 A1 * 8/2021 Gaurav ................ G06F 21/565
2021/0263802 A1 * 8/2021 Gottemukkula .... G06F 11/1435
2022/0075774 A1 * 3/2022 Boehme ........... G06F 16/24537

FOREIGN PATENT DOCUMENTS

KR 20210017142 A * 2/2021 ............ G06N 20/00

* cited by examiner

*Primary Examiner* — Christopher B Robinson
(74) *Attorney, Agent, or Firm* — Greenberg Traurig, LLP

(57) ABSTRACT

A computer-implemented method for measuring entropy during file backups may include (i) detecting an initiation of a backup process for a backup image including multiple files, wherein each of the files is associated with a set of blocks, (ii) sampling, during the backup process, a random selection of a fraction of the blocks associated with each of the files, (iii) determining an entropy value for the files based on the sampling, and (iv) performing a security action that identifies potential ransomware activity in the backup process based on the entropy value corresponding to a presence of encrypted data in the files. Various other methods, systems, and computer-readable media are also disclosed.

20 Claims, 5 Drawing Sheets

300

Start

Detect an initiation of a backup process for a backup image including files associated with a set of blocks
302

Sample, during the backup process, a random selection of a fraction of the blocks associated with each of the files
304

Determine an entropy value for the files based on the sampling
306

Perform a security action that identifies potential ransomware activity in the backup process based on the entropy value corresponding to a presence of encrypted data in the files
308

End

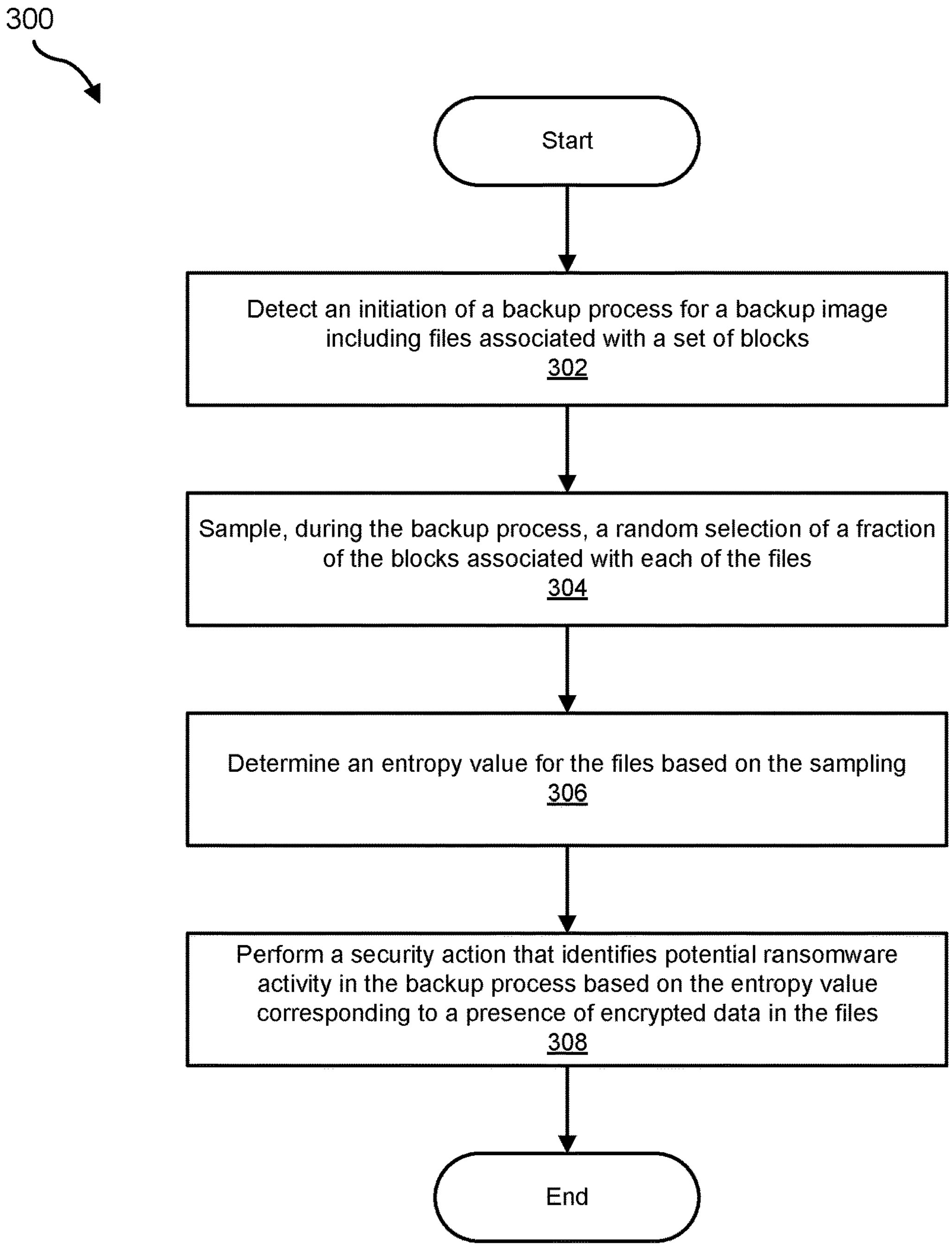

SYSTEMS AND METHODS FOR MEASURING ENTROPY DURING FILE BACKUPS

BACKGROUND

Ransomware is a specific form of malware that may hold a computing device hostage by preventing access to, or otherwise impeding the normal function of, the device unless a user pays to remove the malware. For example, a ransomware attack may encrypt a user's files (using, e.g., a session key) and demanding payment before decrypting the user's files and restoring the user's access to their files. Additionally, ransomware attacks may often result in the backup of encrypted files during active backup operations, thereby leaving users without a recovery option to retrieve these files.

Prior research into detecting ransomware activity has focused on techniques utilizing file-content information (e.g., file entropy), however, these techniques have thus far failed to address implementation drawbacks associated with high memory and CPU overhead as well as high latency. Moreover, these techniques are unable to be implanted in-line during active backup processes.

SUMMARY

As will be described in greater detail below, the present disclosure describes various systems and methods for measuring entropy during file backups.

In one example, a method for measuring entropy during file backups may include (i) detecting, by one or more computing devices, an initiation of a backup process for a backup image including a group of files, each of the group of files being associated with a set of blocks, (ii) sampling, by the one or more computing devices and during the backup process, a random selection of a fraction of the blocks associated with each of the files, (iii) determining, by the one or more computing devices, an entropy value for the files based on the sampling, and (iv) performing, by the one or more computing devices, a security action that identifies potential ransomware activity in the backup process based on the entropy value corresponding to a presence of encrypted data in the files.

In some examples, sampling the random selection of the fraction of the blocks may include (i) randomly selecting a target subset of the blocks, (ii) determining a variable skipping interval for sampling the target subset of the blocks, and (iii) sampling each block in the target subset of the blocks utilizing the variable skipping interval. In one example, the variable skipping interval may represent a scheduled sampling of the random selection of the fraction of the blocks. In some examples, the variable skipping interval may include skipping every other block in the target subset of blocks, skipping every third block in the target subset of blocks, and so on. In some examples, utilizing the aforementioned sampling method decreases a computational overhead and latency associated with determining an entropy value for the set of blocks in each of the files in the backup image as compared to not using sampling.

In some examples, the entropy value for the files may be computed by determining an average entropy value for the random selection of the fraction of the blocks associated with each of the files. In some examples, the security action may be performed by (i) comparing the entropy value to an expected entropy for the backup image, (ii) identifying the presence of the encrypted data when the entropy value exceeds the expected entropy for the backup image, and (iii) detecting the potential ransomware activity based on entropy value.

In one example, a system for measuring entropy during file backups may include at least one physical processor and physical memory comprising computer-executable instructions and a set of modules that, when executed by the physical processor, cause the physical processor to (i) detect, by a detection module, an initiation of a backup process for a backup image including a group of files, each of the group of files being associated with a set of blocks, (ii) sample, by a sampling module and during the backup process, a random selection of a fraction of the blocks associated with each of the files, (iii) determine, by a determining module, an entropy value for the files based on the sampling, and (iv) perform, by a security module, a security action that identifies potential ransomware activity in the backup process based on the entropy value corresponding to a presence of encrypted data in the files.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an initiation of a backup process for a backup image including a group of files, each of the group of files being associated with a set of blocks, (ii) sample, during the backup process, a random selection of a fraction of the blocks associated with each of the files, (iii) determine an entropy value for the files based on the sampling, and (iv) perform a security action that identifies potential ransomware activity in the backup process based on the entropy value corresponding to a presence of encrypted data in the files.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 3 is a flow diagram of an example method for measuring entropy during file backups.

Figure 1:
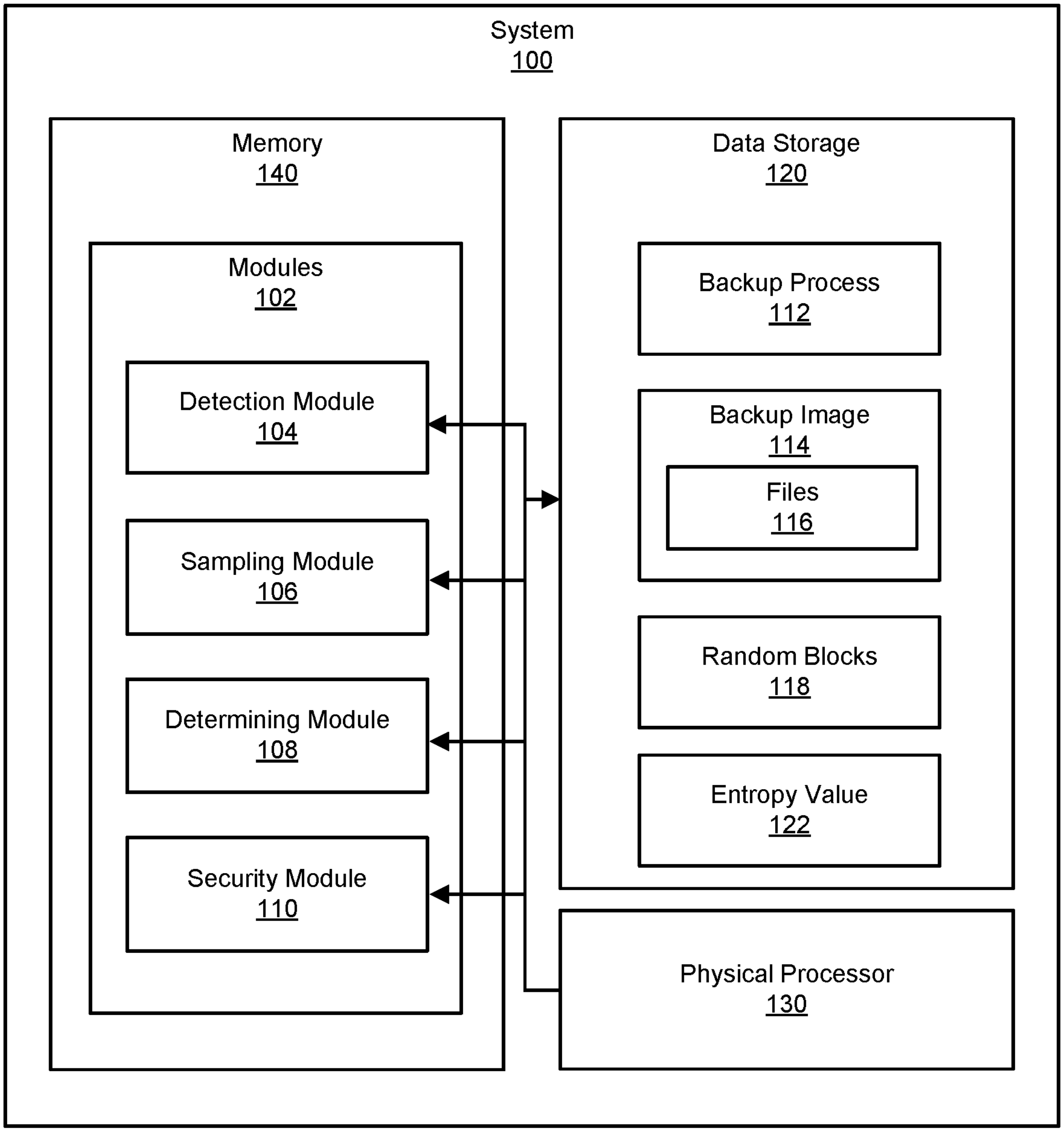
FIG. 1 is a block diagram of an example system for measuring entropy during file backups.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for measuring entropy during file backups. As will be explained in greater detail below, by utilizing sampling, the systems and methods disclosed herein may provide high accuracy, low latency and low overhead entropy computations of files in backup images during a backup process. For example, by detecting an increase in the Shannon entropy of files during the file backup process, the disclosed systems and methods may identify files compromised by encryption operations associated with potential ransomware activity. The disclosed systems and methods may additionally determine the entropy of an entire backup image (i.e., without needing to individually compute the entropy of individual files at a granular level) by performing scheduled sampling which may include skipping file blocks (e.g., sampling every block, then every other block, then every third block, etc.) for which entropy is computed, prior to averaging.

By utilizing sampling to measure entropy in this way, the systems and methods described herein may improve the functioning of a computing device by reducing the number of blocks needed for determining the entropy as compared to the total number of blocks actually read by a backup process, thereby decreasing both high memory and processing overhead associated with determining entropy during an active backup process. Additionally, the systems and methods described herein may improve the technical field of computing device security, and more specifically, ransomware detection, by utilizing sampling to enable the detection of potential ransomware activity during an active backup process with reduced latency and higher accuracy (thereby addressing potential high false-negatives resulting from post-backup detection).

Figure 2:
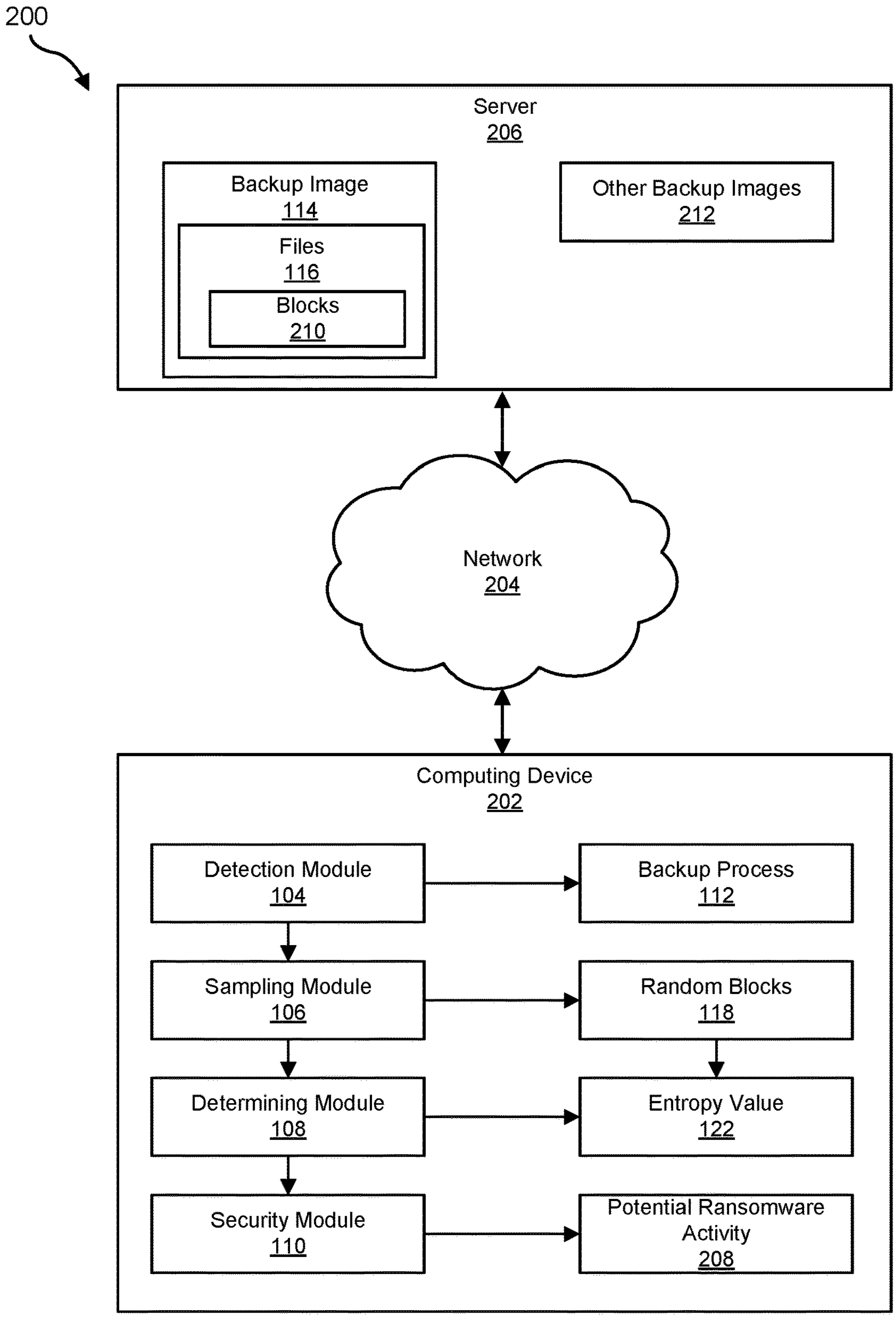
FIG. 2 is a block diagram of an additional example system for measuring entropy during file backups.

The following will provide, with reference to FIGS. 1-2, detailed descriptions of example systems for measuring entropy during file backups. Detailed descriptions of corresponding computer-implemented methods will also be provided in connection with FIGS. 3-4. In addition, a detailed description of a graph showing file block utilization for a sampled entropy computation that may be performed by the example systems of FIGS. 1 and 2, will also be provided in connection with FIG. 5.

FIG. 1 is a block diagram of an example system 100 for measuring entropy during file backups. As illustrated in this figure, example system 100 may include one or more modules 102 for performing one or more tasks. For example, and as will be explained in greater detail below, example system 100 may include a detection module 104 that detects an initiation of a backup process 112 for a backup image 114 including files 116 associated with a set of blocks. Example system 100 may additionally include a sampling module 106 that samples, during backup process 112, a random selection of a fraction of the blocks (i.e., random blocks 118) associated with each of files 116. Example system 100 may also include a determining module 108 that determines an entropy value 122 for files 116 based on the sampling. Example system 100 may additionally include a security module 110 that performs a security action that that identifies potential ransomware activity in backup process 112 based on entropy value 122 corresponding to a presence of encrypted data in files 116. Although illustrated as separate elements, one or more of modules 102 in FIG. 1 may represent portions of a single module or application.

The term "backup process" as used herein, may generally refer to a data storage process in which files are chunked/divided into blocks that are channeled into a de-duplication system for fingerprinting and subsequent writing to storage. For example, a backup process for a 1 GB image may include reading and processing files collectively containing about 250K blocks of data, with each block having a size of 4096 bytes (e.g., 4 KB), by a de-duplication system.

The term "entropy value" as used herein, may generally refer to a result of mathematical operations utilized for computing a Shannon entropy (i.e., a mapping from a collection of bytes to non-negative real numbers) of one or more files in a backup image. For example, a Shannon entropy for a collection of bytes (B) may be represented by the expression $$S(B) \equiv S(H) = -\sum_{i=0}^{255} p_i \log_2 p_i,$$

where B is represented as the frequency distribution H, where, for a histogram comprising a collection of 256 numbers ($p_i \in [0,1]$): $H=\{p_0, p_1, p_2, \ldots, p_{255}\}$, $$\sum_{i=0}^{255} p_i = 1,$$

such that the histogram is normalized.

The term "ransomware activity" as used herein, may generally refer to any form of malware utilizing a variety of encryption algorithms designed encrypt files on computing systems, thereby denying access by a user or organization unless a ransom demand is met for gaining access to a key for decrypting the files.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate measuring entropy during file backups. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include a data storage 120 for storing data. In some examples, data storage 120 may store backup process 112, backup image 114 (including files 116), random blocks 118, and entropy value 122.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to measure entropy during file backups. For example, and as will be described in greater detail below, detection module 104, sampling module 106, determining module 108, and security module 110 may cause computing device 202 and/or server 206 to (i) detect an initiation of backup process 112 for backup image 114 including files 116 (where each of files 116 are associated with a set of blocks 210), (ii) sample, during backup process 112, random blocks 118 associated with each of files 116, (iii) determine entropy value 122 for files 116 based on the sampling, and (iv) perform a security action that identifies potential ransomware activity 208 in backup process 112 based on entropy value 122 corresponding to a presence of encrypted data files 116.

Computing device 202 generally represents any type or form of computing device capable of reading and/or executing computer-executable instructions. In some examples, computing device 202 may be a storage server configured to provide data backup and malware scanning services, such as the NETBACKUP APPLIANCE system provided by VERITAS TECHNOLOGIES, LLC of Santa, Clara, California. Additional examples of server 206 include, without limitation, database servers, application servers, and/or web servers configured to run certain software applications and/or provide various storage, database, and/or web services. Although illustrated as a single entity in FIG. 2, computing device 202 may include and/or represent a plurality of servers that work and/or operate in conjunction with one another.

For example, computing device 202 may additionally work with and/or operate in conjunction with server 206. In some examples, server 206 generally represents any type or form of computing device that is capable of reading and/or executing computer-executable instructions. In one example, server 206 may be a backup server configured to store backup image 114 and other backup images 212 (i.e., from previous data backups). Additional examples of server 206 include, without limitation, storage servers, database servers, application servers, and/or web servers configured to run certain software applications and/or provide various storage, database, and/or web services.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 4:
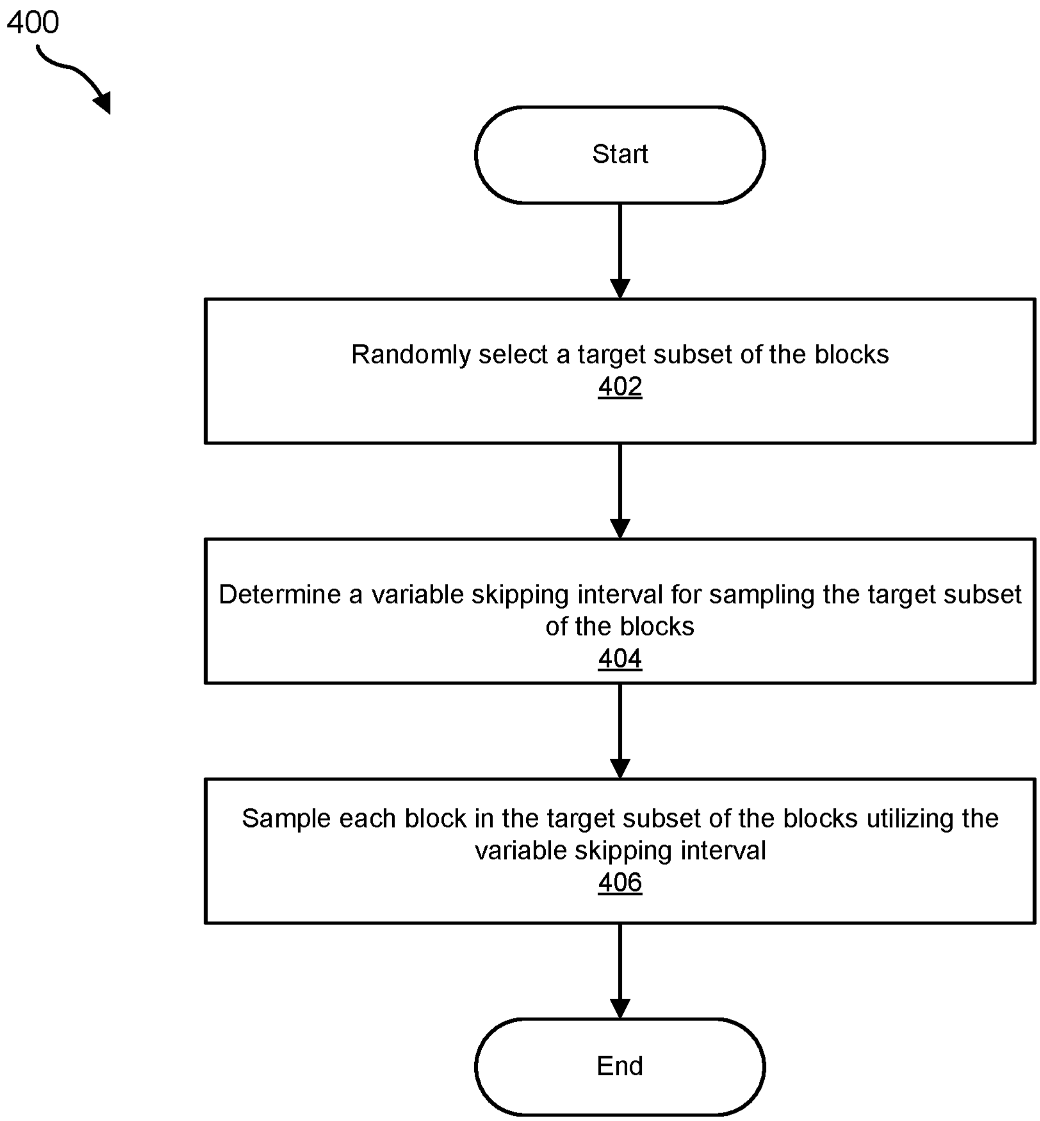
FIG. 4 is a flow diagram of an additional example method for measuring entropy during file backups.

FIGS. 3-4 are flow diagrams of example computer-implemented methods 300 and 400 for measuring entropy during file backups. The steps shown in FIGS. 3-4 may be performed by any suitable computer-executable code and/or computing system, including system 100 in FIG. 1, system 200 in FIG. 2, and/or variations or combinations of one or more of the same. In one example, each of the steps shown in FIGS. 3-4 may represent an algorithm whose structure includes and/or is represented by multiple sub-steps, examples of which will be provided in greater detail below.

As illustrated in FIG. 3, at step 302 one or more of the systems described herein may detect an initiation of a backup process for a backup image including files associated with a set of blocks. For example, detection module 104 may, as part of computing device 202 in FIG. 2, detect an initiation of backup process 112 for backup image 114 including files 116 associated with blocks 210.

Detection module 104 may detect the initiation of backup process 112 in a variety of ways. In some examples, detection module 104 may detect the channeling of blocks 210 (associated with files 116) being channeled into a deduplication system (e.g., system 100) for fingerprinting and subsequent writing to data storage 120.

At step 304, one or more of the systems described herein may sample, during the backup process, a random selection of a fraction of the blocks associated with each of the files. For example, sampling module 1066 may, as part of computing device 202 in FIG. 2, sample random blocks 118 (i.e., random blocks 218 represent a fraction of blocks 210) associated with files 116.

Sampling module 106 may sample random blocks 118, in files 116, in a variety of ways. In some examples, sampling module 106 random blocks 118 may represent a fraction equivalent to 1/100 or 1% of blocks 210 in a file 116. For example, for a block size comprising 1 kilobytes of memory, 1 MB may be sampled out of a 100 MB file for prior to determining entropy value 122. In other examples, sampling module 106 may conduct scheduled sampling as will now be described with respect to FIG. 4.

Turning now to FIG. 4, at step 402, one or more of the systems described herein may randomly select a target subset of blocks. For example, sampling module 106 may, as part of computing device 202 in FIG. 2, randomly select blocks 210, contained in files 116 of backup image 114, as random blocks 118.

At step 404, one or more of the systems described herein may determine a variable skipping interval for sampling the target subset of blocks. For example, sampling module 106 may, as part of computing device 202 in FIG. 2, determine a variable skipping interval for sampling random blocks 118.

Sampling module 106 may determine the variable skipping interval in a variety of ways. In some examples, sampling module 106 may determine the variable skipping interval based on executing a sampling function. For example, during the reading of n blocks during an ongoing backup process, a function α(n), which is an instantaneous sampling fraction of blocks, may be utilized. Continuing with this example, sampling module 106 may determine an interval that skips (1/α(n)−1) blocks between random blocks 118 on which entropy is computed. Thus, in one example, sampling module 106 may begin by sampling every block, then every other block, then every third block (and so on) until all of random blocks 118 have been sampled.

At step 406, one or more of the systems described herein may sample each block in the target subset of the blocks utilizing the variable skipping interval determined at step 404. For example, sampling module 106 may, as part of computing device 202 in FIG. 2, sample random blocks 118 utilizing a skipping interval where every block, then every other block, then every third block (and so on) are sampled.

Returning now to FIG. 3, at step 306, one or more of the systems described herein may determine an entropy value for the files based on the sampling performed at step 304. For example, determining module 108 may, as part of computing device 202 in FIG. 2, determine entropy value 122.

Determining module 108 may determine entropy value 122 in a variety of ways. In some examples, determining module 108 may determine entropy value 122 by determining an average entropy value for random blocks 118. In particular, and in one example, determining module 108 may utilize a streamlined entropy computation technique to determine a file entropy S(F) from sampling according to the following logic:

Let $\{X_i\}_{i=1,2,\ldots,m}$ be m random variables sampled from a Bernoulli distribution with $\mathbb{E}[X_i]=\alpha\ \forall i$. That is, $X_i$ takes the value 1 with probability α and 0 with a probability (1−α). Furthermore, consider blocks $\mathcal{B}=\{b_1, b_2, \ldots b_m\}$ that a file F gets chunked into. Then let $B\subset\mathcal{B}$ be the collection: $B=\{b_i|X_i=1,\ i\in[1,m]\}$, such that $\mathbb{E}(|B|)=\alpha m$. The α-random entropy is defined as: $S\alpha(F)=S(B)\equiv S(\cup\{b_i\})$, and serves as a suitable approximation to S(F). That is, for every $\epsilon>0$, there exists a $1>\delta>0$, such that for all α, $0\le(1-\alpha)\le\delta\Rightarrow|S(F)-S\alpha(F)|<\epsilon$. In other words, a high enough α may be chosen for Sα(F) to approximate S(F) as closely as may be desired. In the limit of α=1, Sα=1(F)=S(F), by definition. As a result, a drastic reduction in overhead may be achieved by noting that even when δ is not small, i.e., $0\le\alpha<<1$, $\epsilon\approx0$. Thus, for a variety of backup workloads, $\epsilon<0.5\%\pm0.3\%$ when α=0.01. Moreover, latency may be reduced as well, as the time complexity of a standard entropy computation is $\mathcal{O}(n)$, where $\mathcal{O}(n)$ represents the most efficient algorithm for computing a histogram from n bytes. Furthermore, it may be understood that entropy computation on am blocks requires 4αm kilobytes of memory. Thus, for a small α=0.01, a 100 MB file entails 1 MB stored in memory before computing the entropy. Thus, solving for $$b_i\in B,\ S(U\{b_i\})\approx 1/\alpha m\sum_{i=1}^{|B|} p_i\ S(b_i),$$

which is a statistical expectation that the entropy of the bytes aggregated over all blocks $b_i\in B$, is equal to an average of entropies of $\{b_i\}$, thus requiring only 4096 bytes in memory at any given time. In some examples, a random selection of blocks (e.g., random blocks 118) may be obtained in the Python programming language utilizing the inbuilt "sample( )" function of the "random" module or, alternatively, in the "R" open source programming language utilizing the function "sample ( )".

In an alternative example, determining module 108 may determine entropy value 122 from scheduled sampling of random blocks 118 (i.e., by skipping (α−1−1) blocks between every block for which the entropy is computed, before averaging). In one example, a scheduled sampling approach may be utilized when determining module 108 may not have a priori knowledge of the size of a backup image I (e.g., backup image 114) before backup process 112 concludes. For example, if a sampling value a is chosen for such that α=0.01, and the size of a backup image I is 200 KB, then only 5 blocks (i.e., 0.01*(200/4)) are sampled. Since an average of the entropy of 5 blocks is prone to a high variance, this is not a statistically reliable estimate of the entropy S(I). As a result, a scheduling approach to sampling may be utilized in these instances.

Continuing with the above example, during an ongoing backup process I, it may be assumed that n blocks have been read. Then, a function α(n) (which is the instantaneous sampling fraction of blocks) may be considered. At that instant, sampling module 106 skips (1/α(n)−1) blocks between blocks on which entropy is computed. A simple ansatz for $\alpha(n)=n^{-k}$ for some $k\in(0, 1)$. Additionally, a boundary condition may be instilled that when n=N=10000, the sampling process has computed entropy for $\alpha_s=2\%$ of these blocks (i.e., 200 blocks). Next, the following expression may be solved:

$$\int_0^N n^{-k}dn=\alpha_s N$$

Figure 5:
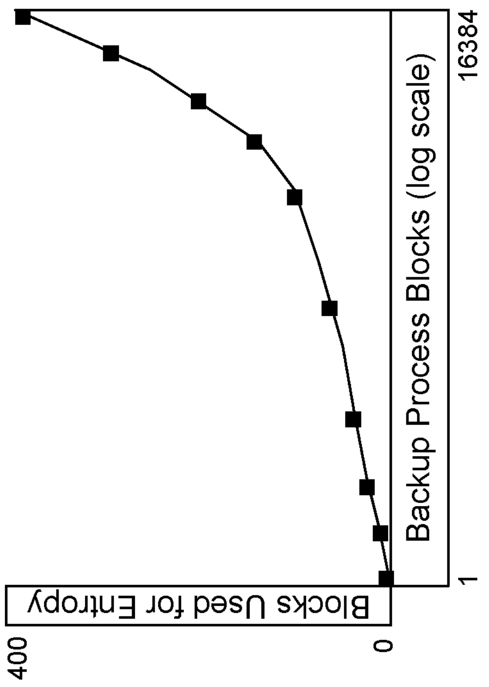
FIG. 5 is a graph diagram showing file block utilization for a sampled entropy computation that may be performed by the example systems of FIGS. 1 and 2.

(e.g., utilizing the scripy.integrate sub-package in the Python programming language) for k=0.5. Thus, the scheduled sampling results in an entropy complexity of $\mathcal{O}(\sqrt{n})$ (as compared to a $\mathcal{O}$(n) standard entropy complexity without the use of sampling). For example, and as shown in FIG. 5, graph 500 shows the number of blocks utilized for a sampled entropy computation $S_{\alpha(n)}(I)$ as being significantly less (i.e., resulting in a reduced complexity) than the number of blocks n actually read by a backup process. Thus, as discussed above, for computing the entropy of a backup image in-line, with no a priori knowledge of the size of the backup, sampling may be carried out with a variable schedule $\alpha(n) \sim 1/\sqrt{n}$, thereby ensuring that $S_{\alpha(n)}(I)$ is a reliable estimator of S(I).

At step 308, one or more of the systems described herein may perform a security action that identifies potential ransomware activity in the backup process based on the entropy value corresponding to a presence of encrypted data in the files. For example, security module 110 may, as part of computing device 202 in FIG. 2, identify potential ransomware activity 208 in backup process 112 based on entropy value 122 corresponding to a presence of encrypted data in files 116.

Security module 110 may identify potential ransomware activity 208 in a variety of ways. In some examples, security module 110 may be configured to compare entropy value 122 to an expected entropy for backup image 114. For example, security module 110 may be configured to compare entropy value 122 to an entropy calculated for another backup image (e.g., one or more of other backup images 212) which may be either a previous entropy value determined by determining module 108 for backup image 114 or for another backup image of a similar size. Then, security module 110 may identify the presence of the encrypted data when entropy value 122 exceeds the expected entropy for backup image 114 (i.e., due to encryption operations being known to generally increase the Shannon entropy of files). Finally, upon identifying the presence (or likelihood of the presence) of encrypted data, security module 110 may detect potential ransomware activity 208.

As explained above in connection with example method 300 in FIG. 3, the systems and methods described herein may provide for measuring entropy during file backups by utilizing sampling. Specifically, the systems and methods described herein may utilize sampling to detect an increase in the Shannon entropy of files during the file backup process and identify files compromised by encryption operations associated with potential ransomware activity. The disclosed systems and methods may additionally determine the entropy of an entire backup image (i.e., without needing to individually compute the entropy of individual files at a granular level) by performing scheduled sampling which may include skipping file blocks (e.g., sampling every block, then every other block, then every third block, etc.) for which entropy is computed, prior to averaging. By utilizing sampling to measure entropy in this way, the systems and methods described herein may reduce the number of blocks needed for determining the entropy as compared to the total number of blocks actually read by a backup process, thereby decreasing both high memory and processing overhead associated with determining entropy during an active backup process. Additionally, the systems and methods described herein, by utilizing sampling to enable the detection of potential ransomware activity during an active backup process, the latency may be reduced and accuracy increased over traditional approaches utilizing post-backup detection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for measuring entropy during file backups, at least a portion of the method being performed by one or more computing devices comprising at least one processor, the method comprising:

detecting, by the one or more computing devices, an initiation of a backup process for a backup image comprising a plurality of files, wherein each of the plurality of files is associated with a set of blocks;

sampling, by the one or more computing devices and in-line during the backup process before identifying a size of the backup image, a random selection of a fraction of the blocks associated with each of the files, the sampling including skipping, from sampling, at least one block from the random selection of the fraction of the blocks associated with each of the files;

determining, by the one or more computing devices, an entropy value for the files, the determining including calculating respective entropy values for the random selection of the fraction of the blocks that are sampled prior to averaging the respective entropy values that are calculated; and performing, by the one or more computing devices, a security action that identifies potential ransomware activity in the backup process based on the entropy value corresponding to a presence of encrypted data in the files.

2. The computer-implemented method of claim 1, wherein sampling, during the backup process, the random selection of the fraction of the blocks, comprises:

randomly selecting a target subset of the blocks;

determining a variable skipping interval for sampling the target subset of the blocks; and sampling each block in the target subset of the blocks utilizing the variable skipping interval.

3. The computer-implemented method of claim 2, wherein determining the variable skipping interval for sampling the target subset of the blocks comprises determining a sampling interval, the sampling interval comprising:

skipping every other block in the target subset of blocks; and skipping every third block in the target subset of blocks.

4. The computer-implemented method of claim 1, wherein sampling, during the backup process, the random selection of the fraction of the blocks comprises decreasing a computational overhead associated with determining an entropy value for the set of blocks in each of the files in the backup image.

5. The computer-implemented method of claim 1, wherein sampling, during the backup process, the random selection of the fraction of the blocks comprises minimizing latency associated with determining an entropy value for the set of blocks in each of the files in the backup image.

6. The computer-implemented method of claim 1, wherein determining the entropy value for the files based on the sampling comprises determining an average entropy value for the random selection of the fraction of the blocks associated with each of the files.

7. The computer-implemented method of claim 1, wherein performing the security action comprises:

comparing the entropy value to an expected entropy for the backup image;

identifying the presence of the encrypted data when the entropy value exceeds the expected entropy for the backup image; and detecting the potential ransomware activity based on entropy value.

8. A system for measuring entropy during file backups, the system comprising:

at least one physical processor;

physical memory comprising computer-executable instructions and one or more modules that, when executed by the physical processor, cause the physical processor to:

detect, by a detection module, an initiation of a backup process for a backup image comprising a plurality of files, wherein each of the plurality of files is associated with a set of blocks;

sample, by a sampling module and in-line during the backup process before identifying a size of the backup image, a random selection of a fraction of the blocks associated with each of the files, the sampling including skipping, from sampling, at least one block from the random selection of the fraction of the blocks associated with each of the files;

determine, by a determining module, an entropy value for the files based on the sampling, the determining including calculating respective entropy values for the random selection of the fraction of the blocks that are sampled prior to averaging the respective entropy values that are calculated; and perform, by a security module, a security action that identifies potential ransomware activity in the backup process based on the entropy value corresponding to a presence of encrypted data in the files.

9. The system of claim 8, wherein the sampling module samples the random selection of the fraction of the blocks by:

randomly selecting a target subset of the blocks;

determining a variable skipping interval for sampling the target subset of the blocks; and sampling each block in the target subset of the blocks utilizing the variable skipping interval.

10. The system of claim 9, wherein the variable skipping interval for sampling the target subset of the blocks is determined by determining a sampling interval, the sampling interval comprising:

skipping every other block in the target subset of blocks; and skipping every third block in the target subset of blocks.

11. The system of claim 8, wherein the sampling module samples the random selection of the fraction of the blocks by decreasing a computational overhead associated with determining an entropy value for the set of blocks in each of the files in the backup image.

12. The system of claim 8, wherein the sampling module samples the random selection of the fraction of the blocks by minimizing latency associated with determining an entropy value for the set of blocks in each of the files in the backup image.

13. The system of claim 8, wherein the determining module determines the entropy value for the files based on the sampling by determining an average entropy value for the random selection of the fraction of the blocks associated with each of the files.

14. The system of claim 8, wherein the security module performs the security action by:

comparing the entropy value to an expected entropy for the backup image;

identifying the presence of the encrypted data when the entropy value exceeds the expected entropy for the backup image; and detecting the potential ransomware activity based on entropy value.

15. A non-transitory computer-readable medium comprising one or more computer-executable instructions that, when executed by at least one processor of a computing device, cause the computing device to:

detect an initiation of a backup process for a backup image comprising a plurality of files, wherein each of the plurality of files is associated with a set of blocks;

sample, in-line during the backup process before identifying a size of the backup image, a random selection of a fraction of the blocks associated with each of the files, the sampling including skipping, from sampling, at least one block from the random selection of the fraction of the blocks associated with each of the files;

determine an entropy value for the files based on the sampling, the determining including calculating respective entropy values for the random selection of the fraction of the blocks that are sampled prior to averaging the respective entropy values that are calculated; and perform a security action that identifies potential ransomware activity in the backup process based on the entropy value corresponding to a presence of encrypted data in the files.

16. The non-transitory computer-readable medium of claim 15, wherein the one or more computer-executable instructions cause the computing device to sample, during the backup process, the random selection of the fraction of the blocks associated with each of the files by:

randomly selecting a target subset of the blocks;

determining a variable skipping interval for sampling the target subset of the blocks; and sampling each block in the target subset of the blocks utilizing the variable skipping interval.

17. The non-transitory computer-readable medium of claim 16, wherein the one or more computer-executable instructions cause the computing device to determine the variable skipping interval for sampling the target subset of the blocks by determining a sampling interval, the sampling interval comprising:

skipping every other block in the target subset of blocks; and skipping every third block in the target subset of blocks.

18. The non-transitory computer-readable medium of claim 15, wherein the one or more computer-executable instructions cause the computing device to sample the random selection of the fraction of the blocks associated with each of the files by:

decreasing a computational overhead associated with determining an entropy value for the set of blocks in each of the files in the backup image; and minimizing latency associated with determining the entropy value for the set of blocks in each of the files in the backup image.

19. The non-transitory computer-readable medium of claim 15, wherein the one or more computer-executable instructions cause the computing device to determine the entropy value for the files, based on the sampling, by determining an average entropy value for the random selection of the fraction of the blocks associated with each of the files.

20. The non-transitory computer-readable medium of claim 15, wherein the one or more computer-executable instructions cause the computing device to perform the security action by:

comparing the entropy value to an expected entropy for the backup image;

identifying the presence of the encrypted data when the entropy value exceeds the expected entropy for the backup image; and detecting the potential ransomware activity based on entropy value.

* * * * *